US008453527B2

(12) United States Patent
Soliman

(10) Patent No.: US 8,453,527 B2
(45) Date of Patent: Jun. 4, 2013

(54) POSITION-SENSING DEVICE AND METHOD

(75) Inventor: Ashraf S. Soliman, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 650 days.

(21) Appl. No.: 12/729,928

(22) Filed: Mar. 23, 2010

(65) Prior Publication Data

US 2011/0232115 A1 Sep. 29, 2011

(51) Int. Cl.

*G01B 21/00* (2006.01)
*G01B 7/00* (2006.01)
*F16K 37/00* (2006.01)

(52) U.S. Cl.

USPC ............................ 73/865.9; 73/1.79; 137/554

(58) Field of Classification Search

USPC ............ 33/501, 502; 73/179, 152.51–152.54, 73/152.59, 168, 865.9, 866.1; 137/553–554
See application file for complete search history.

(56) References Cited

U.S. PATENT DOCUMENTS

| | | | | |
|---|---|---|---|---|
| 3,465,596 | A * | 9/1969 | De Mair | 73/866.1 |
| 3,538,948 | A * | 11/1970 | Nelson et al. | 137/554 |
| 5,197,328 | A * | 3/1993 | Fitzgerald | 73/168 |
| 6,044,849 | A * | 4/2000 | Cewers et al. | 137/543.17 |
| 6,308,723 | B1 * | 10/2001 | Louis et al. | 137/554 X |
| 6,413,179 | B1 * | 7/2002 | Koike | 474/109 |
| 6,826,947 | B2 * | 12/2004 | Solet et al. | 73/1.72 |
| 2004/0031911 | A1 * | 2/2004 | Hoffmann et al. | 250/227.19 |
| 2004/0216874 | A1 * | 11/2004 | Grant et al. | 166/264 |
| 2008/0099967 | A1 * | 5/2008 | Spratte et al. | 267/140.14 |
| 2008/0202608 | A1 * | 8/2008 | Tschida et al. | 137/554 |
| 2009/0266544 | A1 * | 10/2009 | Redlinger et al. | 166/298 |
| 2011/0247484 | A1 * | 10/2011 | Kiesbauer et al. | 91/361 |

FOREIGN PATENT DOCUMENTS

| | | | |
|---|---|---|---|
| EP | 173825 | A1 * | 3/1986 |
| EP | 1967689 | A2 * | 9/2008 |
| GB | 2090419 | A * | 7/1982 |
| JP | 60100008 | A * | 6/1985 |
| JP | 2009285869 | A * | 12/2009 |
| SG | 45271 | A1 * | 1/1999 |
| SU | 1167393 | A * | 7/1985 |

OTHER PUBLICATIONS

International Preliminary Report on Patentability for PCT/US2011/029620, report issued Sep. 2012.*

N Ma et al. "Position control of shape memory alloy actuators with internal electrical resistance feedback using neural networks"; Smart Materials and Structures, vol. 13, Jun. 1, 2004; pp. 777-783.

Y. Wang et al., "Modeling and Control of Electromechanical Valve Actuator"; Society of Automotive Engineers, Inc., SAE 2002-01-1106, copyright 2002, 10 pages.

* cited by examiner

*Primary Examiner* — Thomas P Noland
(74) *Attorney, Agent, or Firm* — Cantor Colburn LLP

(57) ABSTRACT

A movable member position-sensing device includes a sensor and a biasing member in operable communication with both the sensor and a movable member such that it can generate a bias to both the sensor and the movable member and configured to communicate a parameter to the sensor indicative of a position of the movable member.

20 Claims, 2 Drawing Sheets

POSITION-SENSING DEVICE AND METHOD

BACKGROUND

It is often desirable to determine relative positions of movable parts of a system, such as valving components in the downhole completion industry, for example. Although various devices and methods exist to enable an operator to determine relative positions of components, most have drawbacks of one sort or another that limit the scope of their use. Operators are, therefore, receptive to new devices and methods that provide alternate approaches to determining relative positions of components.

BRIEF DESCRIPTION

Disclosed herein is a movable member position-sensing device. The device includes a sensor and a biasing member in operable communication with both the sensor and a movable member configured to communicate a parameter to the sensor indicative of a position of the movable member.

Further disclosed herein is a method of determining the position of a movable member. The method includes biasing the movable member relative to a sensor, mapping output of the sensor to the position of the movable member, and determining the position of the movable member in situ based on the output of the sensor from the mapping.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
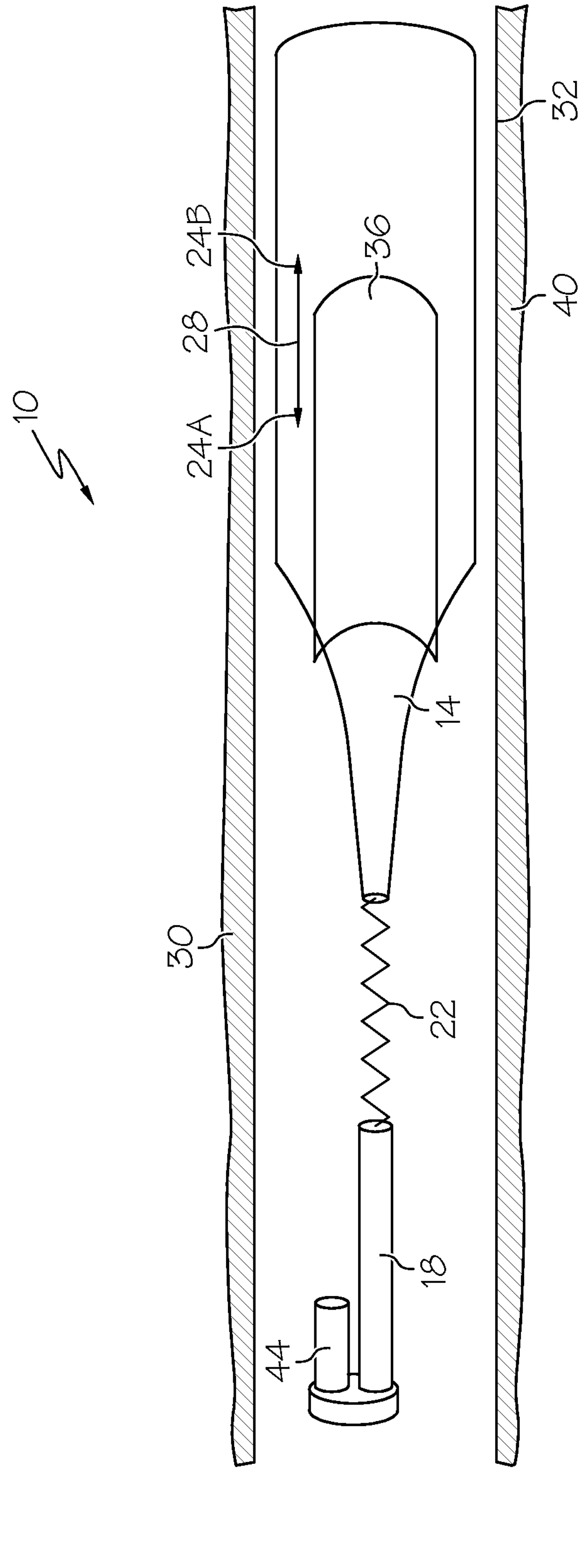
FIG. 1 depicts a schematic view of a position-sensing device disclosed herein.

Referring to FIG. 1, a position-sensing device disclosed herein is illustrated generally at 10. The position-sensing device 10 illustrated in this embodiment includes, a movable member 14, shown as a sliding sleeve of a downhole valve, a sensor 18, shown as a force transducer, and a biasing member 22, shown as a spring. The movable member 14 is movable relative to the sensor 18 in one of two directions 24A and 24B as depicted by arrows 28. Movement of the movable member 14 in the first direction 24A, towards the sensor 18, causes an increase in a biasing force communicated to the sensor 18 by the biasing member 22. Conversely, movement of the movable member 14 in the second direction 24B, away from the sensor 18, causes a decrease in a biasing force communicated to the sensor 18 by the biasing member 22. Note that in alternate embodiments these forces versus movement relationships could be reversed. Mapping an output of the sensor 18 that correlates to all potential positions of the movable member 14 allows an operator to subsequently determine a position of the movable member 14 based on an output of the sensor 18.

In the embodiment of FIG. 1, the position-sensing device 10 is used in a downhole completion within a borehole 30. The movable member 14 is a sliding sleeve that is slidable relative to a tubular 32 within which it is housed. A port 36 through a wall 40 of the tubular 32 can be partially occluded, completely occluded, or not occluded at all by the movable member 14 depending upon the positional location of the movable member 14 relative to the port 36. Since the sensor 18 is fixed in relation to the tubular 32, and outputs of the sensor 18 were mapped for all positions of the movable member 14 prior to the tubular 32 being run into the borehole 30, any position of the movable member 14 can be determined in situ by determining the mapped position that correlates to a specifically sensed output value. In this embodiment the position of the movable member 14 can also be correlated to a percent of the valve that is open.

Additionally, in this embodiment a temperature sensor 44 is incorporated into the position-sensing device 10 and is configured to monitor temperatures of the sensor 18. Although shown as a separate component it should be noted that the temperature sensor 44 can be incorporated into the same circuitry employed by the sensor 18 to minimize any differential in temperature between where the pressure is sensed and where the temperature is sensed. Since outputs of the sensor 18 may vary depending upon actual temperatures of the sensor 18, temperature compensation of the sensor output is possible with the temperature knowledge provided by the temperature sensor 44. Similar temperature compensating can be employed to loads communicated by the biasing member 22 to the sensor 18 that are altered due to changes in temperature.

Figure 2:
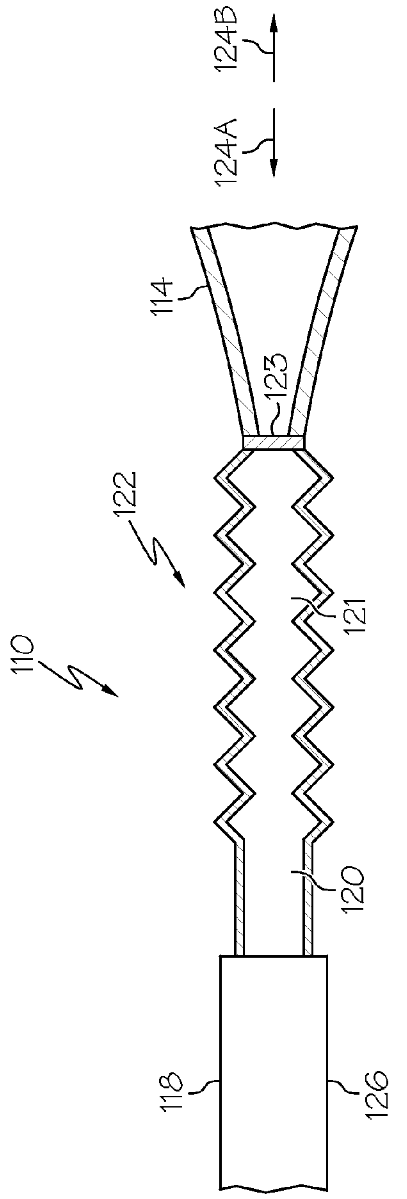
FIG. 2 depicts a partial cross sectional view of an alternate position-sensing device disclosed herein.

Referring to FIG. 2, an alternate embodiment of a position-sensing device is illustrated generally at 110. In the interest of brevity, similar items employed in both the position-sensing device 110 and the device 10 are not shown in this embodiment or described again hereunder. A sensor 118 of the device 110 is a pressure sensor. The pressure sensor 118 senses pressure of a fluid 120 housed within a chamber 121 defined primarily by a bellows 122 that serves as the biasing member in this embodiment. The chamber 121 is fluid tight and is bound by the bellows 122, a wall 123, and the pressure sensor 118. A volume of the chamber 121 changes as position of the movable member 114 changes. For example, as the movable member moves in a first direction 124A the volume of the chamber 121 decreases thereby increasing pressure of the fluid that is sensed by the pressure sensor 118. Conversely, as the movable member moves in a second direction 124B the volume of the chamber 121 increases thereby decreasing pressure of the fluid that is sensed by the pressure sensor 118. It may be desirable to have the fluid 120 be compressible to permit larger repositions of the movable member 114 with smaller changes in pressure sensed.

The bellows 122 allows the chamber 121 to change in volume while remaining hermetically sealed. Additionally, by making the bellows 122, the wall 123, and a housing 126 of the pressure sensor 118 out of metal and joining them together by brazing, soldering or welding, the chamber 122 can be made to remain hermetically sealed while being exposed to extreme environmental conditions, such as conditions commonly encountered in a downhole completion application.

Figure 3:
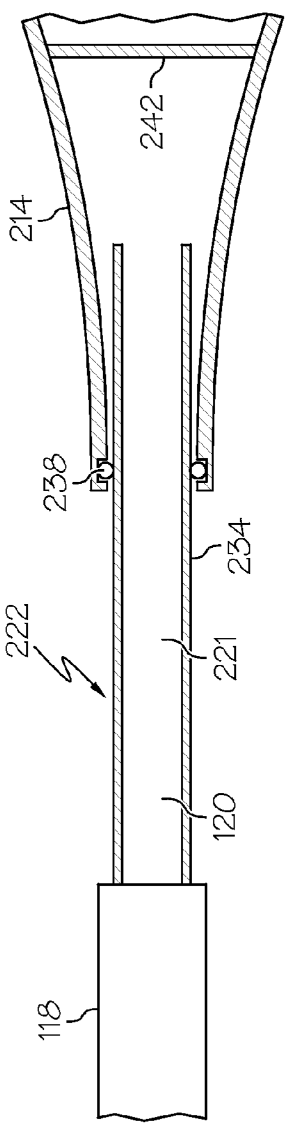
FIG. 3 depicts a partial cross sectional view of another alternate position-sensing device disclosed herein.

Referring to FIG. 3, another alternate embodiment of a position-sensing device is illustrated generally at 210. As with reference to FIG. 2 similar items employed in this embodiment as previous embodiments may not be shown or described again hereunder. The pressure sensor 118 is employed herein coupled with an alternate biasing member

222. The biasing member 222, as with the biasing member 122 includes a chamber 221 with the fluid 120 contained therein. The chamber 122 is defined by a tubular 234 slidably sealed to movable member 214 by a seal 238, illustrated herein as an o-ring, and a wall 242 of the movable member 214. A volume of the chamber 222 changes in response to movements of the movable member 214 towards and away from the pressure sensor 118. The change in volume causes a change in pressure, sensible by the pressure sensor 118. Since the change in pressure is proportional to the position of the movable member 214, an output from the pressure sensor 118 corresponds to a unique and proportional position of the movable member 214.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A movable member position-sensing device comprising:

a sensor configured to measure load; and a linear biasing member in operable communication with both the sensor and a movable member configured to bias the movable member and the sensor in a linear direction of movement of the movable member and to communicate a parameter to the sensor to allow determination of a position of the movable member.

2. The movable member position-sensing device of claim 1, wherein an output of the sensor correlates to all potential positions of the movable member and allows an operator to subsequently determine a position of the movable member based on an output of the sensor.

3. The movable member position-sensing device of claim 1, wherein the sensor is a pressure sensor.

4. The movable member position-sensing device of claim 1, wherein the biasing member is a spring.

5. The movable member position-sensing device of claim 1, wherein the position of the movable member is determined by an output of the sensor.

6. The movable member position-sensing device of claim 1, wherein a value of the parameter is proportional to the position of the movable member.

7. The movable member position-sensing device of claim 1, further comprising a temperature sensor and the movable member position-sensing device is configured to compensate the sensor output for changes in temperature.

8. The movable member position-sensing device of claim 1, wherein the movable member is part of a valve and the movable member position-sensing device allows determination of a percentage of opening of the valve in situ.

9. The movable member position-sensing device of claim 1, wherein the movable member position-sensing device is configured to function in a downhole environment.

10. A movable member position-sensing device comprising:

a sensor;

a biasing member in operable communication with both the sensor and a movable member configured to communicate a parameter to the sensor indicative of a position of the movable member, wherein the biasing member includes a chamber containing fluid.

11. The movable member position-sensing device of claim 10, wherein the fluid is compressible.

12. The movable member position-sensing device of claim 10, wherein the chamber includes a bellows.

13. The movable member position-sensing device of claim 12, wherein the bellows is fluid tight.

14. The movable member position-sensing device of claim 12, wherein the bellows is metal.

15. The movable member position-sensing device of claim 10, wherein the chamber includes a sliding seal.

16. A method of determining position of a movable member comprising:

biasing the movable member in a linear direction of movement relative to a load sensor;

mapping output of the load sensor to position of the movable member; and determining position of the movable member in situ based on the output of the load sensor from the mapping.

17. The method of determining position of a movable member of claim 16 further comprising biasing the sensor with pressure.

18. The method of determining position of a movable member of claim 16 further comprising biasing the sensor with force.

19. The method of determining position of a movable member of claim 16 further comprising sensing temperature of the sensor in situ.

20. The method of determining position of a movable member of claim 19 further comprising compensating the output of the sensor based upon the sensing of temperature.

* * * * *